US006892104B2

(12) United States Patent
Patil et al.

(10) Patent No.: US 6,892,104 B2
(45) Date of Patent: May 10, 2005

(54) SYSTEM AND METHOD FOR MANUFACTURING PRODUCTS ACCORDING TO CUSTOMER ORDERS

(75) Inventors: Satish Y. Patil, Austin, TX (US); Mark D. Brown, Pflugerville, TX (US); Michael T. Graham, Austin, TX (US); John H. Sanders, Austin, TX (US); C. Michael Cunningham, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 673 days.

(21) Appl. No.: 09/799,859

(22) Filed: Mar. 5, 2001

(65) Prior Publication Data

US 2001/0041947 A1 Nov. 15, 2001

Related U.S. Application Data

(63) Continuation-in-part of application No. 09/484,712, filed on Jan. 18, 2000, now Pat. No. 6,516,242.

(51) Int. Cl.[7] .............................................. G06F 19/00
(52) U.S. Cl. ..................... 700/95; 700/112; 700/117; 700/230; 700/111; 29/705
(58) Field of Search ...................... 700/216, 95, 230, 700/105, 213, 228, 112, 113, 116, 115, 117, 111; 702/108, 188; 705/7, 1; 29/784, 705, 771, 783, 791; 198/346, 346.2; 53/154

(56) References Cited

U.S. PATENT DOCUMENTS 3,792,785 A   2/1974  Weir ..................... 214/16.4 A
3,796,327 A   3/1974  Meyer et al. ........... 214/38 BB
4,310,276 A   1/1982  Castagnoli ................. 414/134

(Continued)

FOREIGN PATENT DOCUMENTS

EP   0 308 248       9/1988   ........... B62D/65/00
EP   0 606 515 A2    3/1993
EP   0 606 515       3/1993   ............ B23Q/7/14

(Continued)

OTHER PUBLICATIONS

U.S. Appl. No. 09/426,232 filed Oct. 22, 1999, entitled "Site–To–Site Dynamic Virtual Local Area Network" filed by Wiedeman et al. and assigned to Dell USA, L.P., Oct. 22, 1999.

(Continued)

*Primary Examiner*—Leo Picard
*Assistant Examiner*—Steven R. Garland
(74) *Attorney, Agent, or Firm*—Baker Botts L.L.P.

(57) ABSTRACT

A build cell for manufacturing products according to customer orders includes a build station at which components are assembled according to a customer order to form an assembled product. The build cell also includes a burn station at which the assembled product is configured and tested to form a configured product. In addition, the build cell includes a finishing station at which the configured product is inspected to produce a finished product. A transportation device transports the finished product from the build cell to a transportation system for delivery to a boxing facility, such that the product is assembled, configured, tested, and inspected in the build cell and packaged at the boxing facility. In an illustrative embodiment, the product is a computer, the components include hardware components, which are assembled at the build station, and software is installed at the burn station.

17 Claims, 8 Drawing Sheets

U.S. PATENT DOCUMENTS

| | | | |
|---|---|---|---|
| 4,336,589 A | 6/1982 | Smith et al. ................ 364/403 |
| 4,473,935 A | 10/1984 | Tatsuura et al. ............. 29/429 |
| 4,501,528 A | 2/1985 | Knapp ....................... 414/273 |
| 4,509,123 A | 4/1985 | Vereen ...................... 364/300 |
| 4,544,318 A | 10/1985 | Nagatomo et al. .......... 414/222 |
| 4,566,595 A | 1/1986 | Fustier ...................... 209/545 |
| 4,669,047 A | 5/1987 | Chucta ...................... 364/468 |
| 4,692,876 A | 9/1987 | Tenma et al. ............... 364/513 |
| 4,703,558 A * | 11/1987 | Makinen ..................... 29/784 |
| 4,711,016 A | 12/1987 | Genschow et al. .......... 29/568 |
| 4,722,653 A | 2/1988 | Williams et al. ............ 414/222 |
| 4,738,387 A | 4/1988 | Jaufmann et al. ............ 228/4.1 |
| 4,798,290 A | 1/1989 | Bradford .................... 206/328 |
| 4,815,190 A | 3/1989 | Haba, Jr. et al. ............. 29/430 |
| 4,821,197 A | 4/1989 | Kenik et al. ................ 364/468 |
| 4,823,233 A | 4/1989 | Brown et al. ............... 361/383 |
| 4,866,628 A | 9/1989 | Natarajan ................... 364/468 |
| 4,894,908 A | 1/1990 | Haba, Jr. et al. ............. 29/711 |
| 4,966,280 A | 10/1990 | Bradford .................... 206/721 |
| 5,017,260 A | 5/1991 | Bardford ................. 156/308.2 |
| 5,019,963 A | 5/1991 | Alderson et al. ........... 364/200 |
| 5,037,027 A | 8/1991 | Nichols ................... 229/198.1 |
| 5,038,283 A | 8/1991 | Caveney ..................... 235/385 |
| 5,099,431 A | 3/1992 | Natarajan ................... 364/468 |
| 5,131,212 A | 7/1992 | Grey et al. .................... 53/472 |
| 5,144,532 A | 9/1992 | Wessely et al. ............. 361/385 |
| 5,146,732 A | 9/1992 | Grey et al. .................... 53/472 |
| 5,155,847 A | 10/1992 | Kirouac et al. ............. 395/600 |
| 5,193,065 A | 3/1993 | Guerindon et al. ......... 364/468 |
| 5,205,406 A | 4/1993 | Bradford .................... 206/328 |
| 5,216,593 A | 6/1993 | Dietrich et al. ............. 364/402 |
| 5,216,613 A | 6/1993 | Head, III ................. 369/275.2 |
| 5,218,510 A | 6/1993 | Bradford .................... 361/220 |
| 5,229,948 A | 7/1993 | Wei et al. ................... 364/468 |
| 5,241,482 A | 8/1993 | Lida et al. .................. 700/110 |
| 5,247,683 A | 9/1993 | Holmes et al. ............. 395/700 |
| 5,247,747 A | 9/1993 | Grey et al. .................... 53/472 |
| 5,255,181 A | 10/1993 | Chapman et al. .......... 364/401 |
| 5,255,197 A | 10/1993 | Iida ............................ 364/468 |
| 5,262,954 A | 11/1993 | Fujino et al. ............... 364/468 |
| 5,271,703 A | 12/1993 | Lindqvist et al. ........... 414/268 |
| 5,321,605 A | 6/1994 | Chapman et al. .......... 364/402 |
| 5,327,354 A | 7/1994 | Tsujimoto ................... 364/478 |
| 5,344,024 A | 9/1994 | Cohu .......................... 206/526 |
| 5,353,243 A | 10/1994 | Read et al. ................. 364/578 |
| 5,367,624 A | 11/1994 | Cooper ....................... 395/157 |
| 5,371,679 A | 12/1994 | Abe et al. ................... 364/468 |
| 5,386,621 A | 2/1995 | Fluegge et al. ............... 29/705 |
| 5,398,336 A | 3/1995 | Tantry et al. ............... 707/103 |
| 5,411,151 A | 5/1995 | Sasada ....................... 209/583 |
| 5,450,317 A | 9/1995 | Lu et al. ..................... 364/402 |
| 5,456,061 A | 10/1995 | Grey et al. .................... 53/472 |
| 5,469,691 A | 11/1995 | Grey et al. .................... 53/472 |
| 5,485,369 A | 1/1996 | Nicholls et al. ............ 364/401 |
| 5,513,427 A | 5/1996 | Yokoyama et al. ........... 29/701 |
| 5,522,539 A | 6/1996 | Bazany ....................... 229/199 |
| 5,540,536 A | 7/1996 | Hoedl ........................ 414/417 |
| 5,542,237 A | 8/1996 | Grey et al. .................... 53/472 |
| 5,579,231 A | 11/1996 | Sudou et al. ........... 364/468.01 |
| 5,586,021 A | 12/1996 | Fargher et al. ......... 364/468.06 |
| 5,590,794 A | 1/1997 | Zachary ...................... 209/702 |
| 5,593,269 A | 1/1997 | Bernard, II ................. 414/331 |
| 5,596,502 A | 1/1997 | Koski et al. ........... 364/468.01 |
| 5,597,113 A | 1/1997 | Bradford ................. 229/120.36 |
| 5,608,621 A | 3/1997 | Caveney et al. ............ 395/216 |
| 5,613,606 A | 3/1997 | Meyer ........................ 206/449 |
| 5,613,610 A | 3/1997 | Bradford .................... 206/721 |
| 5,630,070 A | 5/1997 | Dietrich et al. ............. 395/208 |
| 5,653,351 A | 8/1997 | Grout et al. ................ 212/315 |
| 5,666,493 A | 9/1997 | Wojcik et al. ................ 705/26 |
| 5,672,039 A | 9/1997 | Perry et al. ................. 414/280 |
| 5,712,989 A | 1/1998 | Johnson et al. ............. 395/228 |
| 5,720,157 A | 2/1998 | Ross ............................ 53/445 |
| 5,748,478 A | 5/1998 | Pan et al. ...................... 700/99 |
| 5,758,329 A | 5/1998 | Wojcik et al. ................ 705/28 |
| 5,768,133 A | 6/1998 | Chen et al. ................... 700/95 |
| 5,787,283 A | 7/1998 | Chin et al. .................. 395/701 |
| 5,822,216 A | 10/1998 | Satchell, Jr. et al. .... 364/479.01 |
| 5,826,238 A | 10/1998 | Chen et al. ..................... 705/8 |
| 5,867,714 A | 2/1999 | Todd et al. ................. 395/712 |
| 5,869,820 A | 2/1999 | Chen et al. ................. 235/376 |
| 5,873,449 A | 2/1999 | Davenport ............. 198/370.09 |
| 5,880,960 A | 3/1999 | Lin et al. ...................... 700/99 |
| 5,894,571 A | 4/1999 | O'Connor ................... 395/652 |
| 5,896,292 A | 4/1999 | Hosaka et al. ......... 364/468.15 |
| 5,903,457 A | 5/1999 | Chang ................... 364/468.01 |
| 5,916,508 A | 6/1999 | Bradford .................... 264/263 |
| 5,919,247 A | 7/1999 | Van Hoff et al. ........... 709/217 |
| 5,936,860 A | 8/1999 | Arnold et al. ......... 364/468.01 |
| 5,937,388 A | 8/1999 | Davis et al. .................... 705/8 |
| 5,943,841 A | 8/1999 | Wünscher .................... 53/154 |
| 5,963,743 A | 10/1999 | Amberg et al. ............. 395/712 |
| 5,966,694 A * | 10/1999 | Rothschild et al. ............ 705/7 |
| 5,971,587 A | 10/1999 | Kato et al. .............. 364/468.22 |
| 5,974,547 A | 10/1999 | Klimenko ...................... 713/2 |
| 5,991,543 A | 11/1999 | Amberg et al. ............. 395/712 |
| 5,991,732 A | 11/1999 | Moslares ....................... 705/8 |
| 5,995,757 A | 11/1999 | Amberg et al. ............. 395/712 |
| 6,038,486 A | 3/2000 | Saitoh et al. ................. 700/96 |
| 6,039,168 A | 3/2000 | Head, III ................ 198/341.07 |
| 6,052,684 A * | 4/2000 | Du .............................. 707/8 |
| 6,076,652 A | 6/2000 | Head, III ................ 198/341.07 |
| 6,080,207 A | 6/2000 | Kroening et al. ............. 717/11 |
| 6,109,444 A | 8/2000 | Bagwell et al. ............. 206/589 |
| 6,128,588 A | 10/2000 | Chacon ......................... 700/6 |
| 6,139,240 A | 10/2000 | Ando ......................... 414/267 |
| 6,141,647 A * | 10/2000 | Meijer et al. .................. 705/1 |
| 6,144,945 A | 11/2000 | Garg et al. .................... 705/28 |
| 6,148,291 A | 11/2000 | Radican ........................ 705/28 |
| 6,170,630 B1 | 1/2001 | Goss et al. ................... 193/35 |
| 6,182,275 B1 | 1/2001 | Beelitz et al. ................. 717/1 |
| 6,202,070 B1 | 3/2001 | Nguyen et al. ............. 707/104 |
| 6,202,824 B1 * | 3/2001 | Goss et al. ............... 198/346.2 |
| 6,205,473 B1 | 3/2001 | Thomasson et al. ........ 709/217 |
| 6,236,901 B1 * | 5/2001 | Goss ........................... 700/95 |
| 6,247,126 B1 | 6/2001 | Beelitz et al. ................. 713/1 |
| 6,263,253 B1 | 7/2001 | Yang et al. ................... 700/99 |
| 6,285,967 B1 * | 9/2001 | Rajan et al. ................. 702/188 |
| 6,308,496 B1 * | 10/2001 | Lee et al. ...................... 53/154 |
| 6,314,337 B1 | 11/2001 | Marcum ..................... 700/216 |
| 6,336,053 B1 | 1/2002 | Beatty ........................ 700/108 |
| 6,377,561 B1 | 4/2002 | Black et al. ................. 370/330 |
| 6,397,385 B1 | 5/2002 | Kravitz ....................... 717/173 |
| 6,442,683 B1 | 8/2002 | Fleming, III ................... 713/1 |
| 6,499,115 B1 | 12/2002 | Wiedeman et al. ........... 714/30 |
| 6,507,765 B1 | 1/2003 | Hopkins et al. ............... 700/95 |
| 6,523,045 B1 | 2/2003 | Beatty ..................... 707/104.1 |
| 2001/0027350 A1 | 10/2001 | Koga et al. |
| 2002/0103709 A1 | 8/2002 | Anthony et al. .............. 705/22 |
| 2002/0107600 A1 | 8/2002 | Crampton et al. .......... 700/100 |
| 2002/0128810 A1 | 9/2002 | Craig et al. |
| 2002/0156663 A1 | 10/2002 | Weber et al. |

FOREIGN PATENT DOCUMENTS

| | | | |
|---|---|---|---|
| JP | 61094930 | 5/1986 | ........... B65G/61/00 |
| JP | 61155128 | 7/1986 | ........... B65G/63/00 |
| JP | 3005894 | 1/1991 | ........... G07B/15/00 |
| JP | 6013449 | 1/1994 | ........... H01L/21/68 |
| JP | 6345269 | 12/1994 | ........... B65G/57/03 |
| JP | 7110834 | 4/1995 | ........... G06F/19/00 |

| JP | 8147568 | 6/1996 | ............ G07G/1/12 |
| JP | 8295409 | 11/1996 | ........... B65G/1/137 |
| JP | 11306233 | 11/1999 | ........... G06F/17/60 |
| JP | 11310312 | 11/1999 | ........... B65G/1/137 |

OTHER PUBLICATIONS

U.S. Appl. No. 09/426,932 filed Oct. 22, 1999, entitled "Dynamic Virtual Local Area Network Connection Process" filed by Wiedeman et al. and assigned to Dell USA, L.P., Oct. 22, 1999.

U.S. Appl. No. 09/333786, filed Jun. 15, 1999.

U.S. Appl. No. 09/413463, filed Oct. 6, 1999.

U.S. Appl. No. 09/378020, filed Aug. 19, 1999.

Tom Feare's, "Less Automation Means More Productivity at Sun", Modern Materials Handling, pp. 39–41, Nov. 1995.

U.S. Appl. No. 09/053,524 entitled "Build to Order with Continuous Flow Manufacturing" filed by Goss; Dell USA, Assignee, Filed Mar. 31, 1998.

McHugh Software International, McHugh Software International Makes the "Glass Pipeline" a Reality, New Global Visibility Product is Cornerstone of Supply Chain Command & Control, at internet <http://www.mchugh.com/In_The_News/Oct19_00.htm>, Oct. 19, 2000.

McHugh Software International, McHugh's Logistics Execution Solution for High Tech/Electronic Companies, at internet <http://www.mchugh.com/industry/hitech_elec.htm>, printed Jan. 25, 2001.

* cited by examiner

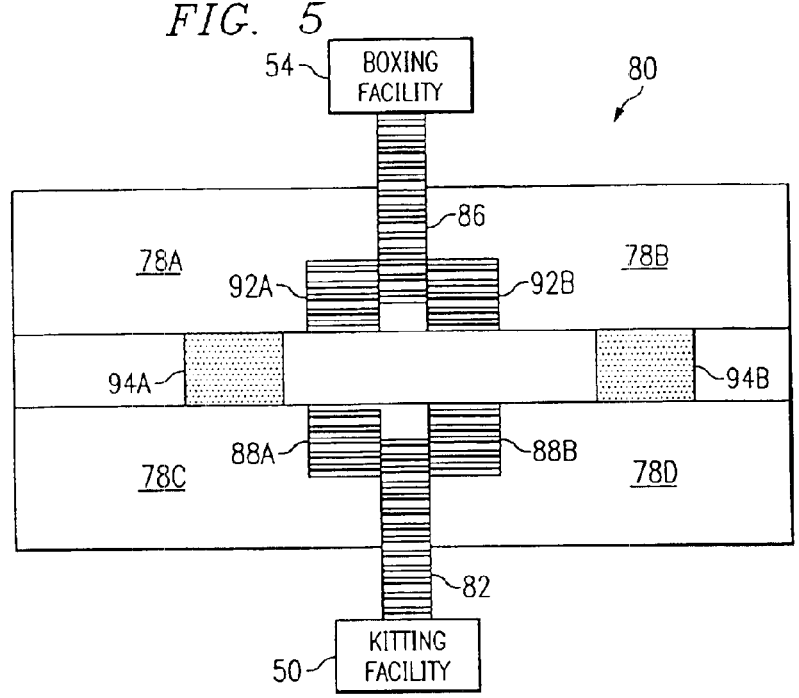
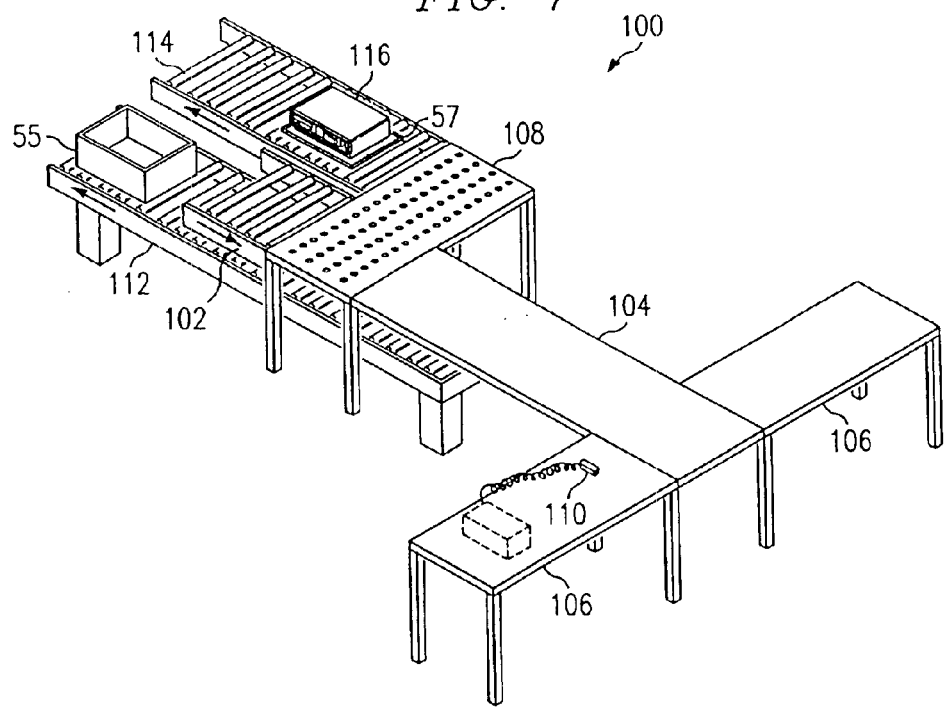

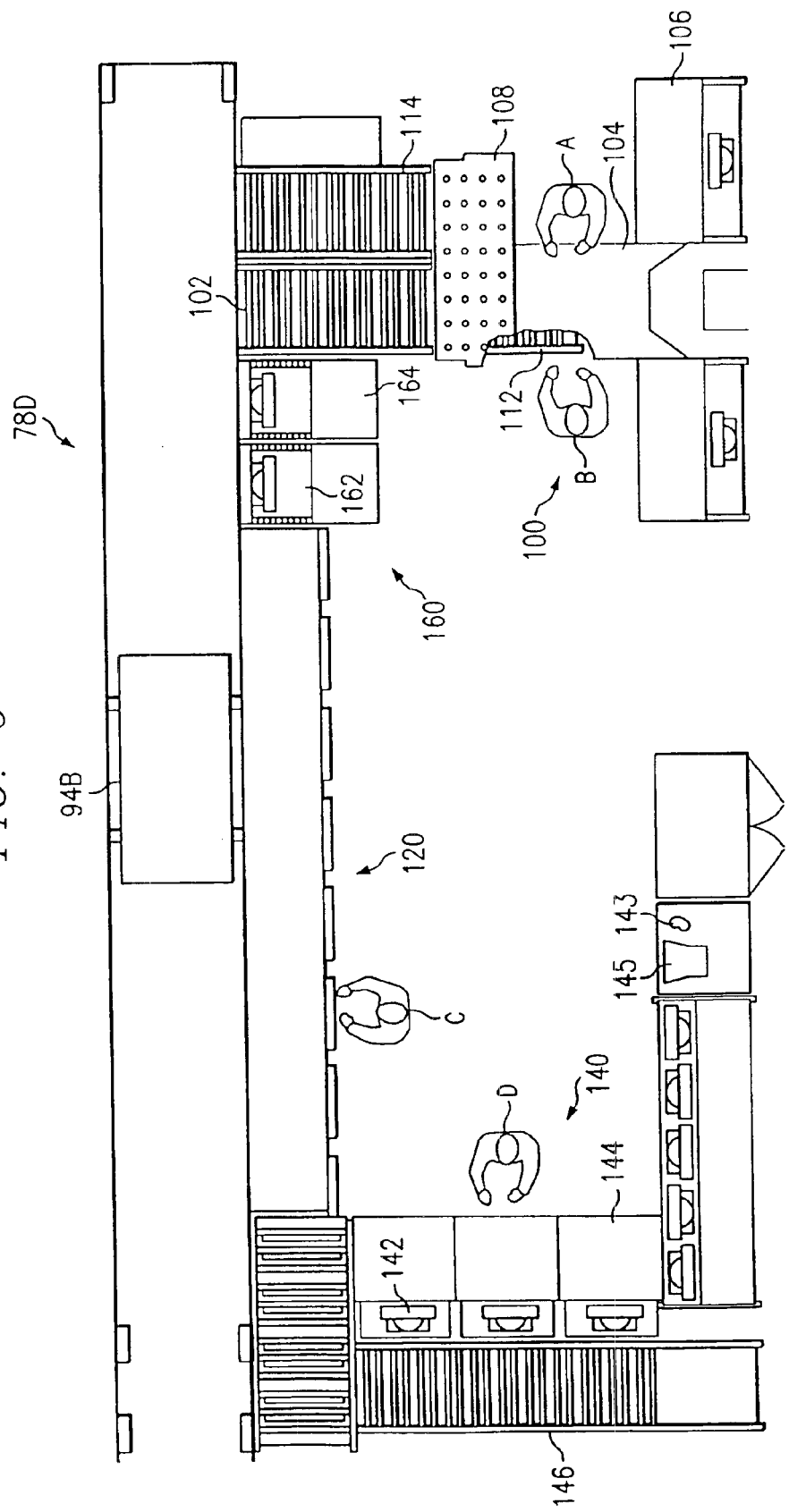

SYSTEM AND METHOD FOR MANUFACTURING PRODUCTS ACCORDING TO CUSTOMER ORDERS

This application is a continuation-in-part of U.S. patent application Ser. No. 09/484,712 entitled Method and Apparatus for Consolidating Manufacturing of Devices filed by Mark D. Brown on Jan. 18, 2000. now U.S. Pat. No. 6,516,242.

This application is related to application Ser. No. 09/799,850 filed Mar. 5, 2001 entitled System and Method for Accommodating Atypical Customer Requirements in a Mass Customization Manufacturing Facility filed by Stephen H. Lawton et al., now U.S. Pat. No. 6,631,606.

TECHNICAL FIELD

The present disclosure relates in general to methods and systems for manufacturing products. In particular, the present disclosure relates to facilities and methods for manufacturing products such as computer systems in response to specific customer orders.

BACKGROUND

Many years ago, manufacturers learned that, when building sufficiently large quantities of identical products, assembly lines could be used to increase production rates and decrease per-unit production costs. In an assembly line, the assembly process is divided in a series of processing steps through which the work-in-process moves to result in the end product or finished product. These steps may be optimized, and once the manufacturing system becomes operational it will build a number of products with the same configuration using the optimized steps.

Assembly lines are typically used in a build-to-stock production model, where large quantities of identical products are manufactured in anticipation of forecasted demand. The manufactured products are then warehoused until that demand is realized. Build-to-stock manufacturing systems are therefore primarily suited to markets in which manufacturers can accurately predict customer demand.

In many markets, however, predicting customer demand is risky, at best. For example, in the market for computer systems and related items, technological improvements are realized so frequently and component prices change so rapidly that it is difficult to accurately predict how large the market for any particular product will ultimately be. As a result, when manufacturers in industries like information technology utilize the build-to-stock model, those manufacturers frequently find themselves with stocks of manufactured goods that are difficult or impossible to market at a profit (i.e., with stale inventory).

A contrasting model of production that helps manufacturers avoid the stale-inventory problem is the build-to-order model. According to the build-to-order model, each product is assembled only after receiving a customer order for that product. In response to receiving the customer order, the manufacturer builds the product according to the order. For purposes of this document, a product that is manufactured "according to" a customer order is a product that is (1) manufactured in response to a specific order from a customer and (2) manufactured to have the features specified in that order.

A disadvantage traditionally associated with the build-to-order model is that more time is required to fill orders, since the products must be manufactured, not simply taken from stock. Another disadvantage is that build-to-order manufacturing systems are typically less efficient than build-to-stock manufacturing systems, which drives up the cost of products that are built to order. Accordingly, build-to-order systems have typically been utilized in markets for luxury items, such as tailored clothing, and markets in which a paucity of manufacturers leaves consumers with little choice but to bear the high prices and delays that are generally passed down by build-to-order manufacturers.

Some manufacturers have attempted to minimize the delays associated with the build-to-order model by maintaining a significant inventory of the materials required for production (e.g., the components that are assembled to create the finished goods). Simply carrying such an inventory, however, imposes costs on manufacturers, including the costs associated with warehousing the material. Furthermore, in markets where product innovations occur rapidly, such material oftentimes become stale.

For example, in contemporary times, the market for computer systems (including, without limitation, minicomputers, mainframe computers, personal computers, servers, work stations, portables, hand held systems, and other data processing systems) has been marked by high and increasing rates of product innovation. Further, to manufacture, for example, a typical personal computer, many different components are required, including a processor, memory, additional data storage (such as a hard disk drive), a number of peripheral devices that provide input and output (I/O) for the system, and adapter cards (such as video or sound cards) for communicating with the peripheral devices. Each of those components is also typically available in many different variations. In such markets, even if using the build-to-order model, manufacturers risk significant losses when carrying significant inventories of material.

Also, it is difficult to optimize build-to-order manufacturing facilities in terms of labor requirements and space requirements, as such facilities must be able to produce of a wide variety of products. However, in markets where many manufacturers are competing for customers, such as the computer system market, any reduction in production costs that does not decrease product quality is an important improvement.

Among the cost-saving measures that a manufacturer may employ is to follow the direct-ship model, in which the manufacturer avoids middlemen such as distributors and retailers by accepting orders directly from and shipping products directly to customers. However, additional costs are borne by a manufacture that provides a direct-ship option, in that the manufacture must provide distribution facilities, in addition to providing the manufacturing facilities.

SUMMARY

The present disclosure relates to a manufacturing facility that provides build-to-order products and direct shipment of products to customers. More specifically, the present disclosure relates to a manufacturing facility that is constructed and operated in such a manner as to enjoy numerous benefits, relative to prior art manufacturing facilities, including the benefit of reduced production costs.

According to the present disclosure, a build cell for manufacturing products according to customer orders includes a build station at which components are assembled to form an assembled product. The build cell preferably includes a burn station at which the assembled product is configured and tested to form a configured product. In addition, the build cell includes a finishing station at which the configured product is inspected to produce a finished product. A transportation device transports the finished product from the build cell to a transportation system for delivery to a boxing facility. The product is assembled, configured, tested, and inspected in the build cell and packaged at the boxing facility. In an illustrative embodiment, the product is a computer, the components include hardware components, which are assembled at the build station. Software may be installed at the burn station.

BRIEF DESCRIPTION OF THE DRAWINGS

The present disclosure and its numerous objects, features, and advantages may be better understood by reference to the following description of an illustrative embodiment, taken in conjunction with the accompanying drawings, in which:

FIG. 5 is a generalized top view of a quadruplet of build cells and portions of an associated transportation system according to FIG. 3;

FIG. 6 is a generalized top view of a build cell according to FIG. 5;

FIG. 7 is a generalized isometric view of a build station and associated transportation devices according to FIG. 6;

DETAILED DESCRIPTION

Figure 1:
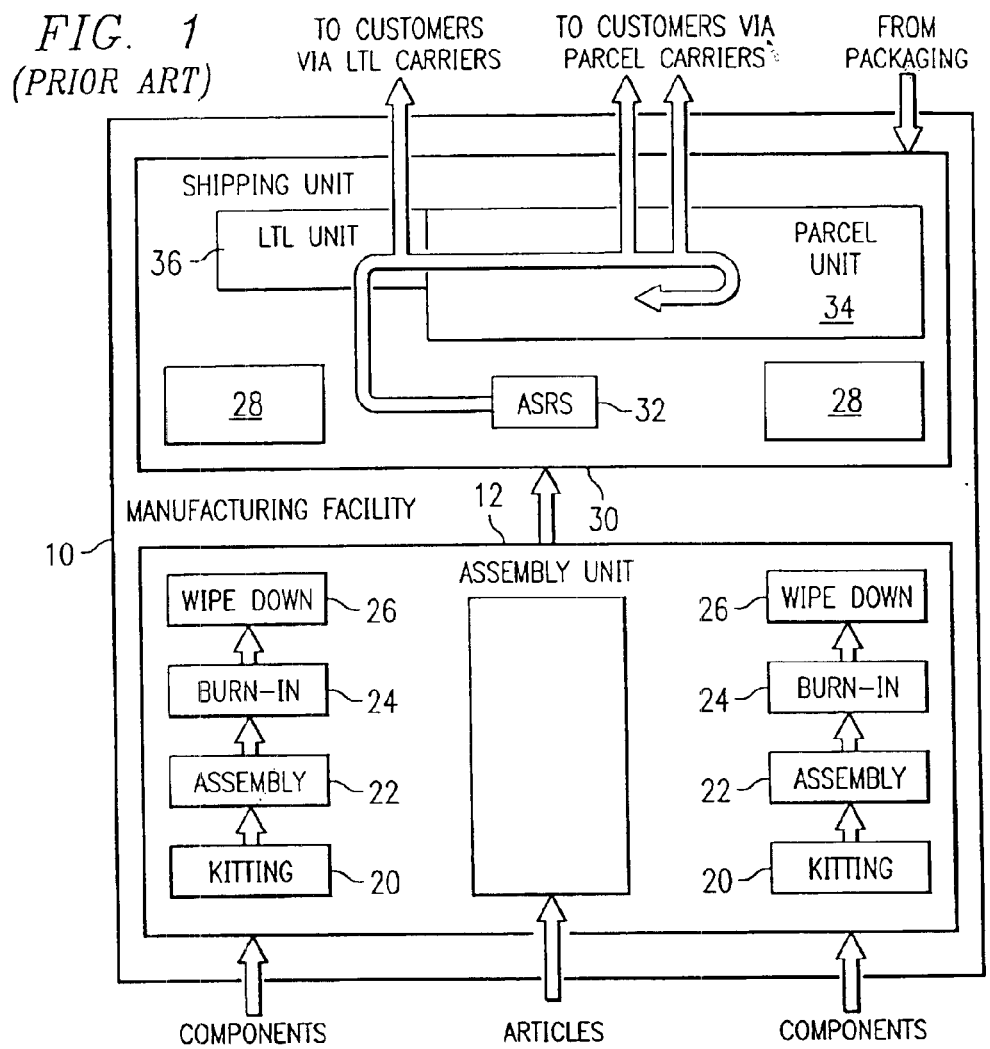
FIG. 1 is a generalized top view of a manufacturing facility for producing products such as computer systems in a build-to-order fashion.

FIG. 1 depicts a prior art manufacturing facility 10 for building products according to customer orders and shipping products directly to customers. This particular manufacturing facility 10 is designed to produce computer systems, which may be shipped to customers together with associated articles, such as speakers, printers, docking stations for portable computers (e.g., advanced port replicators (APRs)), monitors, etc. The computer systems themselves are assembled from components such as motherboards, central processing units (CPUs), video cards, network cards, hard disk drives, floppy disk drives, CD-ROM drives, memory, chassis, etc.

Manufacturing facility 10 includes an assembly unit 12, which contains a number of assembly lines where system assembly takes place in a series of operations. In particular, the components are transported through and processed in at least five separate stations, beginning with a kitting station 20, where the components required for each system are collected together to form a kit for that system. The kit of components is transported to an assembly station 22, where the hardware components are assembled to form the computer system. The computer system is then transported down the assembly line to a burn-in station 24, where software is loaded onto the computer system and system tests are performed. The system is then transported further down the assembly line to a wipe-down station 26, where the system is cleaned and additional tests may be performed. The computer system is then transported to a boxing station 28 within a shipping unit 30 of manufacturing facility 10, where the system is boxed in preparation for shipping.

Shipping unit 30 also includes an automated storage and retrieval system (ASRS) 32, a parcel unit 34, and a less-than-trailer load (LTL) unit 36. Relatively small orders are shipped to customers via parcel carriers through parcel unit 34, and larger orders are loaded onto pallets and shipped to customers via LTL carriers through LTL unit 36.

Figure 2:
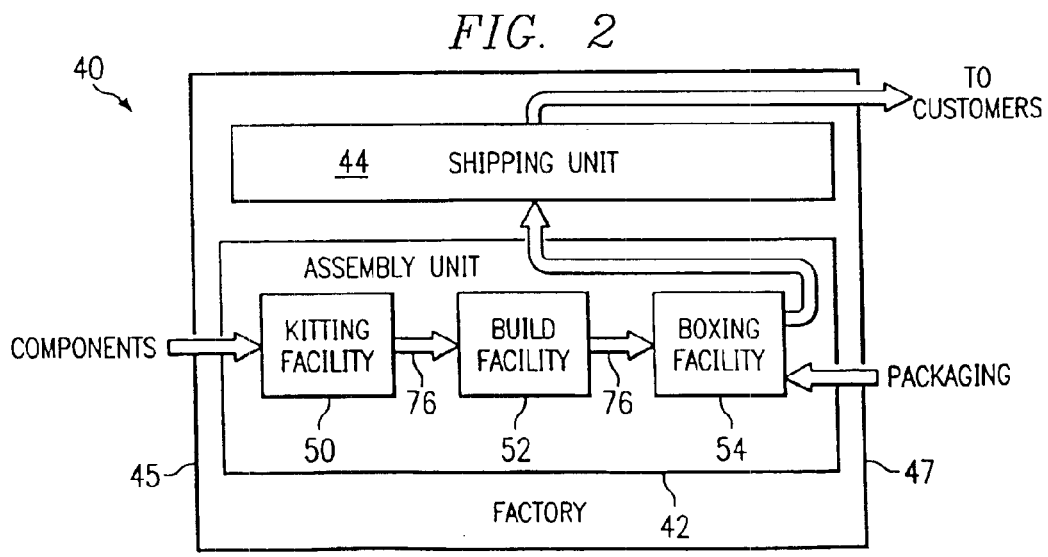
FIG. 2 is a generalized top view of one embodiment of a manufacturing facility according to the present disclosure.

Referring now to FIG. 2, there is illustrated a high-level block diagram of an exemplary manufacturing facility 40 for manufacturing products according to customer orders. In the exemplary embodiment, manufacturing facility 40 is used to manufacture computers, which are shipped directly to customers, along with associated articles (such as monitors, etc). As previously noted, manufacturing facility 10 also manufacturers and directly ships computers to customers. However, as described below, manufacturing facility 40 is operated according to a new process and includes significant architectural enhancements, new hardware, and new control logic that provides increased quality and efficiency.

In the illustrated embodiment, many management decisions for the manufacturing process and most of the information regarding the location and status of the various devices, materials, and other inputs and outputs of the manufacturing process are made and collected in an automatic manner by one or more manufacturing control systems (hereinafter referred to collectively as the manufacturing control system). For example, the manufacturing control system may include one or more interlinked data processing systems, including input devices such as barcode scanners, scales, keyboards, etc., and output devices such as displays, printers, electronic data interchange (EDI) ports, conveyor controllers, etc. The manufacturing control system may also include control logic implemented as one or more control programs. Portions of the manufacturing control system related to particular tasks may be referred to as subsystems.

Manufacturing facility 40 preferably resides in a building that includes an assembly unit 42 and a shipping unit 44. Assembly unit 42 preferably includes three distinct sections: a kitting facility 50, a build facility 52, and a boxing facility 54. Further, the three sections are preferably disposed as illustrated in FIG. 2, with kitting facility 50 and boxing facility 54 situated adjacent to exterior walls 45 and 47, and build facility 52 situated between kitting facility 50 and boxing facility 54.

Figure 3:
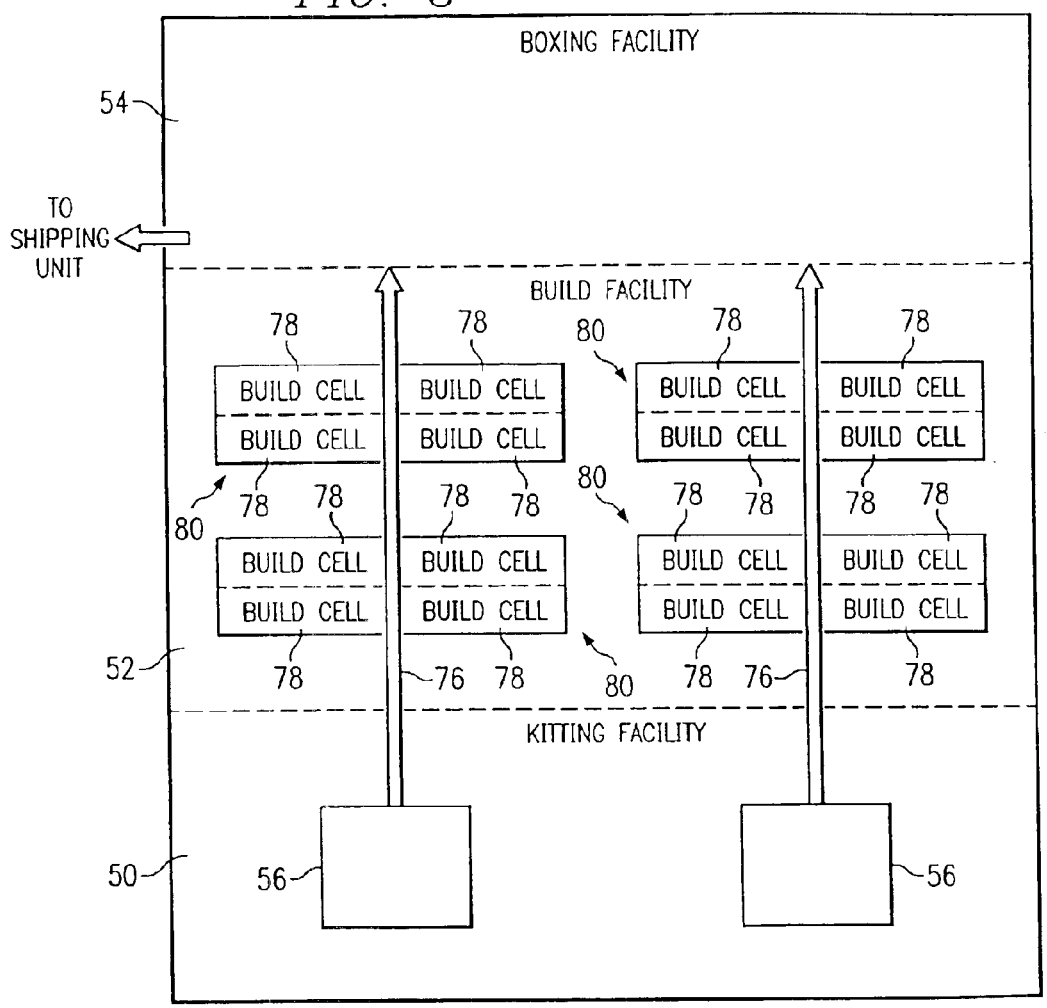
FIG. 3 is a generalized top view of the assembly unit of FIG. 2.

With reference now also to FIG. 3, in the illustrated embodiment, kitting facility 50 includes a number of kitting lines 56, at which operators collect the components required to build computers, by reference, for example, to a bill of material or traveler. The traveler is a document that uniquely identifies that particular computer throughout the assembly process. The traveler preferably includes one or more barcodes with identifying information for the computer, as well as a list of the specific components that are to be picked and assembled. The decisions as to which computers will be built and the printing of the corresponding travelers is preferably performed by the manufacturing control system.

Preferably, the components for each computer are placed into a separate container (also referred to as a tote). (For example, see tote 55 in FIG. 7). The process of collecting the components to be used in assembling a particular product may also be referred to as kitting, and the collected components may be referred to as kits. A traveler is preferably also placed in or on the tote with the components. Totes may be reused repeatedly, and kitting lines 56 may contain tote return devices (not shown) for receiving totes from which the components have been removed. In the illustrated embodiment, most components are placed in the tote, but the computer chassis generally sits on a system tray that has been placed on top of the tote. (For example, see system tray 57 in FIG. 7).

The loaded tote may then be lifted to an overhead transportation system 76, which transports totes to build facility 52 for product assembly and transports finished products from build facility 52 to boxing facility 54 to be packaged.

In the illustrated embodiment, build facility 52 includes a number of build cells 78 within which assembly occurs, and those build cells 78 may be arranged in groups of four. A group of four build cells may be referred to as a quadruplet of build cells 80, or simply a cell quad 80. In FIG. 3, four cell quads 80 are shown, along with two transportation systems 76, with two cell quads 80 situated in series along (and preferably below) each transportation system 76. In addition, two kitting lines 56 are shown, with one transportation system 76 linking each kitting line 56 to two of cell quads 80 and linking those two cell quads 80 with boxing facility 54. In alternative embodiments, however, different numbers of transportation systems, kitting lines, and build cells could be utilized. For example, four transportation system could be provided, two kitting lines could merge onto one or more of the transportation systems, and six cell quads could be disposed along each transportation system.

Figure 4:
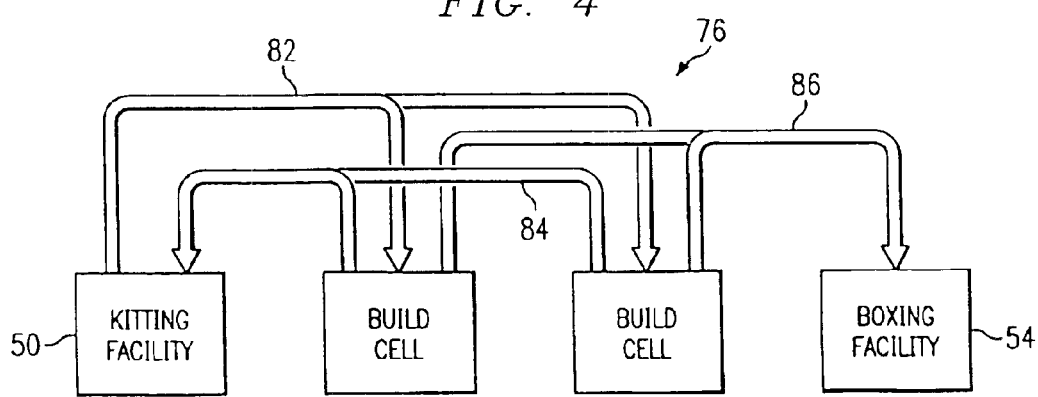
FIG. 4 is a generalized side view of portions of an exemplary transportation system that brings kits to build cells and takes products from build cells.

Referring now to FIG. 4, in the illustrated embodiment, each transportation system 76 includes three distinct transportation devices: an incoming conveyor 82, a tote return conveyor 84, and a outgoing conveyor 86. Incoming conveyor 82 transports totes with components to build cells, tote return conveyor 84 transports empty totes from build cells back to a tote return device within kitting facility 50, and outgoing conveyor 86 transports finished products from build cells to boxing facility 54.

With reference to FIG. 5, an exemplary cell quad 80 is depicted, including four build cells 78A, 78B, 78C, and 78D, with each of the build cells disposed adjacent to two others. (E.g., build cell 78A is adjacent to build cells 78B and 78C.) As shown, incoming conveyor 82 preferably includes two staging areas or spurs 88A and 88B for each cell quad 80, and the manufacturing control system preferably automatically diverts the incoming totes onto one of incoming spurs 88A or 88B, based on a determination of the optimum build cell for assembling the specific product in question. For example, the determination could be made based on which build cell had the most capacity for additional work, which build cell had gone the longest without receiving work, which build cell had all of the tools necessary to build the particular computer, or a combination of these and/or other factors. Likewise, outgoing conveyor 86 preferably includes two outgoing spurs 92A and 92B for each cell quad 80, for receiving finished products from that cell quad 80.

Specifically, in the illustrated embodiment, spurs 88A and 92A receive totes coming to and products coming from (respectively) the two build cells situated to the left of transportation system 76 (i.e., build cells 78A and 78C). Similarly, spurs 88B and 92B receive totes coming to and products coming from (respectively) the two build cells situated to the right of transportation system 76 (i.e., build cells 78B and 78D).

In the illustrated embodiment, cell quad 80 includes two receiving apparatuses 94A and 94B, with receiving apparatus 94A moving laterally between build cells 78A and 78C and receiving apparatus 94B moving laterally between build cells 78B and 78D. Receiving apparatus 94A lowers each tote from spur 88A and 88B into the build cell that was determined to be optimum build (as described above) and lifts finished products from build cells 78A and 78C to spur 92A of outgoing conveyors 86. Receiving apparatus 94B performs corresponding functions for the cells and spurs on right side of transportation system 76. Receiving apparatuses 94A and 94B may be implemented as multi-axis elevators, each capable of moving material along a vertical axis and two horizontal axes, and receiving apparatuses 94A and 94B may perform additional functions, as described below. Receiving apparatuses 94A and 94B may also be referred to as transportation devices.

Referring now to FIG. 6, build cell 78D is depicted in greater detail. Build cell 78D preferably includes a build station 100, a burn station 120, and a finishing station 140. Finishing station 140 may also be referred to as a post-burn station, post-burn operations station, or wipe-down station. Build cell 78D may also include additional stations, such as a quick-test station 160. Preferably, many of the build cells include the same features, but those features are preferably arranged differently, so that opposite build cells are generally mirror images of each other.

Figure 11A:
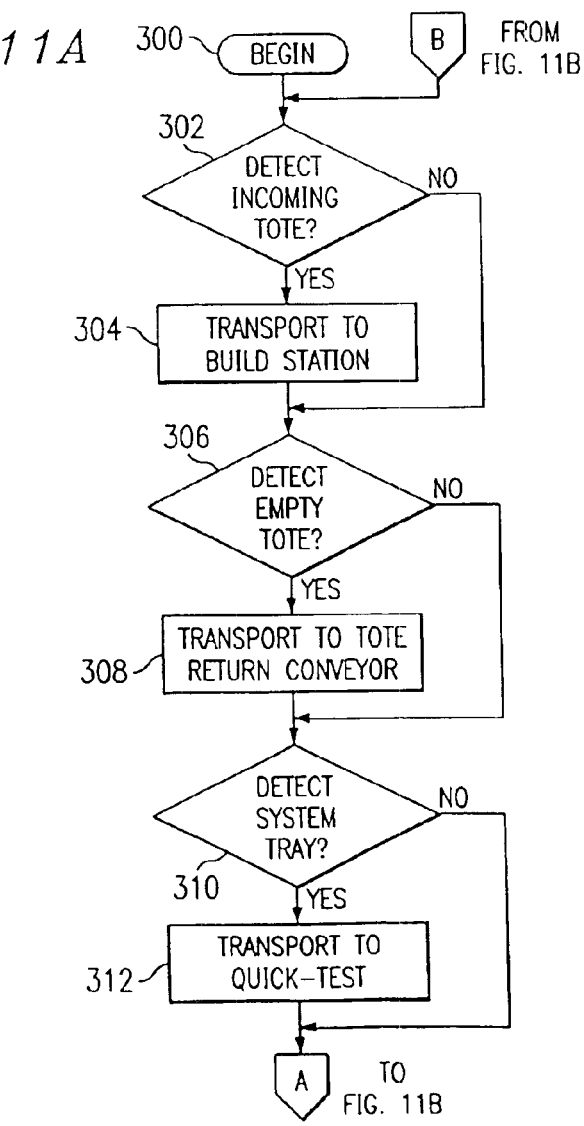
FIGS. 11A and 11B depict a flowchart of an exemplary process for manufacturing products according to customer orders.
Figure 11B:
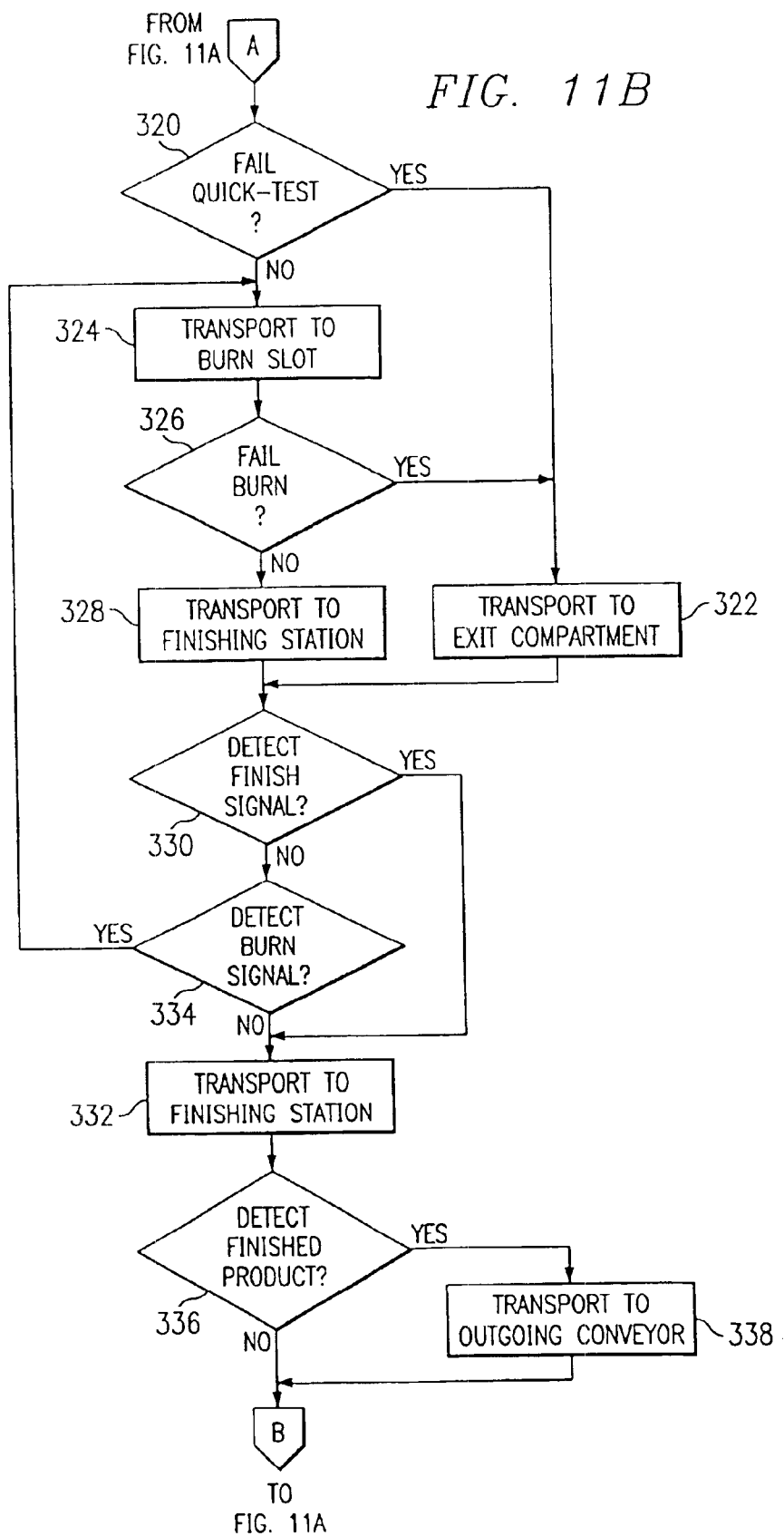

With reference also to FIGS. 11A and 11B, an exemplary process for manufacturing products according to customer orders is depicted in relation to build cell 78D. The illustrated process begins at block 300, with manufacturing facility 40 in the midst of executing a production cycle. As illustrated at block 302, the manufacturing control system (e.g., a subsystem thereof with control logic for receiving apparatus 94A) then determines whether an incoming tote has been detected on spur 88B (for example, through use of a photo-electric sensor). If a tote is detected, receiving apparatus 94A automatically retrieves the tote and deposits it at build station 100 (block 304).

Specifically, with reference now to FIG. 7, build station 100 may include a first conveyor 102, and receiving apparatus 94A may place the tote on first conveyor 102. First conveyor 102 may then automatically transport the tote to a position closer to a build bench 104 within build station 100. This automatic operation, and others like it, may also be triggered by photoelectric sensors (not illustrated) disposed on the various conveyors and other transportation devices within build cell 78D. Build station 100 may include additional working surfaces 106 for assembling computers and/or holding miscellaneous small parts and tools, for example. The portion of build bench 104 adjacent to first conveyor 102 preferably includes a reduced-friction surface 108 (e.g., a surface with ball bearings partially imbedded therein) to facilitate tote sliding. Also, a barcode scanner 110 is preferable provided at build bench 100. In addition, build station 100 is preferably configured to allow two operators A and B to cooperate in assembling the components.

When a tote is received, operator A or B may lift the system tray with the chassis off of the tote and position the tray (with the chassis) on build bench 104 where both operators A and B can comfortably reach the chassis. The traveler may then be scanned with scanner 110. Operators A and B may then take turns retrieving components from the tote, scanning barcodes on those components with scanner 110, and installing the scanned components in the chassis. The manufacturing control system automatically updates various databases and location and status indicators, based on the information from the scans. For example, a database may be maintained to document which types of components were actually installed in each particular computer.

Once the tote has been emptied, operator A or B may move the tote to a return conveyor 112, which may automatically move the empty tote to a tote staging area. (For example, see tote 56.) The manufacturing control system may monitor the tote staging area and, upon detecting an empty tote (block 306), respond by causing receiving apparatus 94A to transport the empty tote from the tote staging area to tote return conveyor 84 (block 308).

Once the components have been assembled (e.g., once all the components have been installed in the computer chassis), operator A or B may slide the system tray (with the assembled components) to an assembly conveyor 114. (For example, system tray 57 and computer 116 are depicted on assembly conveyor 114.) The assembled components may be referred to as an assembled product. Assembly conveyor 114 may automatically move the assembled product to an assembly staging area. Upon detecting the assembled product at the assembly staging area (block 310), receiving apparatus 94A may automatically transport the assembled product to another station within build cell 78D. In the illustrative embodiment, the assembled product is moved to quick-test station 160 at this time (block 312).

Quick-test station 160 may include four shelves 164 that hold the assembled product being tested, as well as various I/O devices (e.g., two displays 162) for interacting with the assembled products. Each shelf is preferably capable of being slid out to provide access to all sides of an assembled product situated thereon, and electrical controls (e.g., two push buttons labeled "pass" and "fail," respectively) are preferably disposed near each shelf 164.

A brief test may be run on each assembled product to confirm that the components are operational (e.g., that the components have been connected properly). If the assembled product fails the test, repairs may be attempted on shelf 164, the assembled product may be returned to build station 100 for repair, or the assembled product may be sent to a dedicated electromechanical repair (EMR) station for repair. Specifically, in the illustrated embodiment, operator B operates quick-test station 160. The illustrated process passes from block 312 to block 320 through page connector A with the test being performed. Operator B may then press a pass button or a fail button (not shown) to indicate that the quick test has been completed (and that all cables have been disconnected, if necessary) and to indicate whether the assembled product failed the test.

Figure 8:
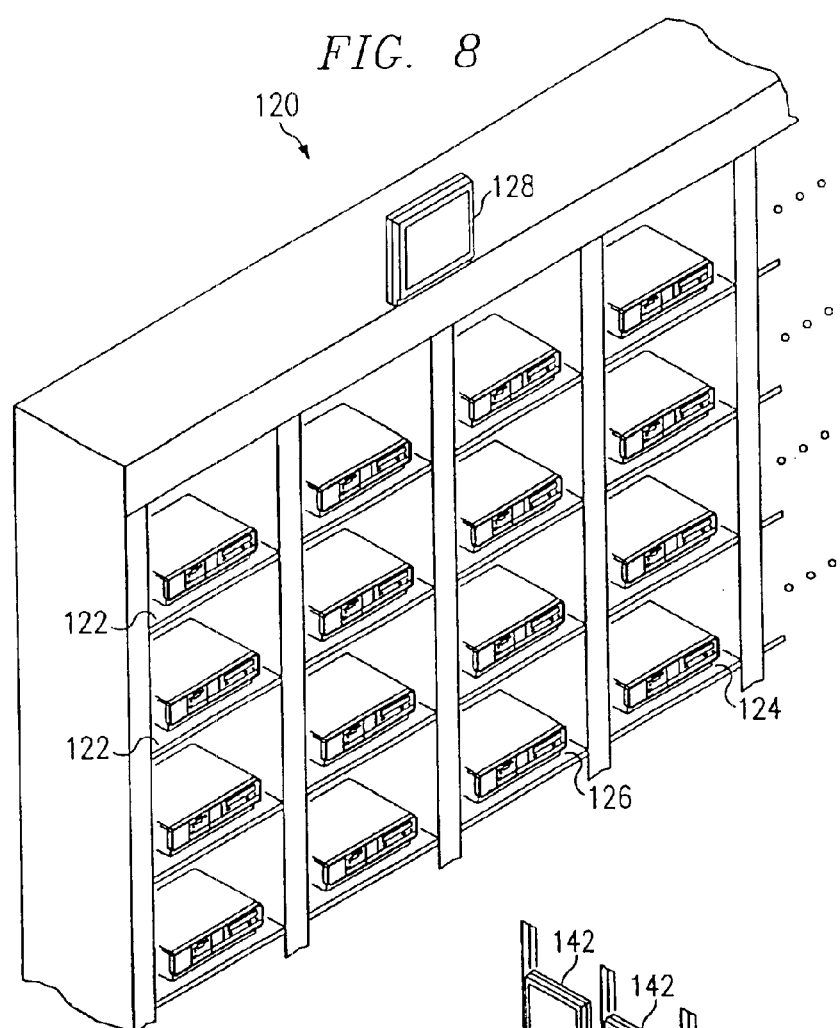
FIG. 8 is a generalized isometric view of a burn station according to FIG. 6.

Referring now also to FIG. 8, in response to a fail signal (block 320), the manufacturing control system causes receiving apparatus 94A to move the assembled product to an exit compartment 124 within burn station 120 (block 322). The non-operational assembled product may be removed from exit compartment 124 with a cart and wheeled to the EMR station. By contrast, in response to a pass signal, the manufacturing control system causes receiving apparatus 94A to move the assembled product to a burn compartment 122 in burn station 120 (block 324).

In the illustrated embodiment, burn station 120 preferably includes a plurality of burn compartments 122 arranged in a matrix with multiple rows and columns, so that many assembled products (e.g., computers) can be burned in simultaneously. Burn station 120 may also include a display 128 for providing visual output from a selected assembled products in the burn process. In addition, burn station 120 may provide burn controls and burn-status indicators (not shown) for each compartment 122. When an assembled product is received in one of burn compartments 122, operator C may connect the assembled product to various cables (e.g., power, video, network connection, etc.) and then utilize the burn controls to initiate an automated burn process, in which operations such as software installation and system tests are performed.

If a burn-status indicator shows that the burn process has failed, operator C may disconnect the cables and utilize a fail button among the burn controls to cause receiving apparatus 94A to move the assembled product to exit compartment 124 (blocks 326 and 322). After a successful burn, however, the assembled product is considered a configured product, and operator C may disconnect the cables and utilize a pass button to cause receiving apparatus 94A to move the configured product to finishing station 140 (block 328).

Burn station 120 may also include a return compartment 126 for receiving an assembled product or configured product that has returned from the EMR station. Return compartment 126 may feature a burn control (not shown) which, when pressed (block 330), causes receiving apparatus 94A to move an assembled product to one of burn compartments 122 (block 332). Return compartment 126 may also feature a finish control (not shown) which, when pressed (block 334), causes receiving apparatus 94A to move a configured product to finishing station 140 (block 324). Thus, computers (for example) that have been repaired and burned in at EMR, as well as those that have been repaired only, may be sent to appropriate stations from return compartment 126.

Figure 9:
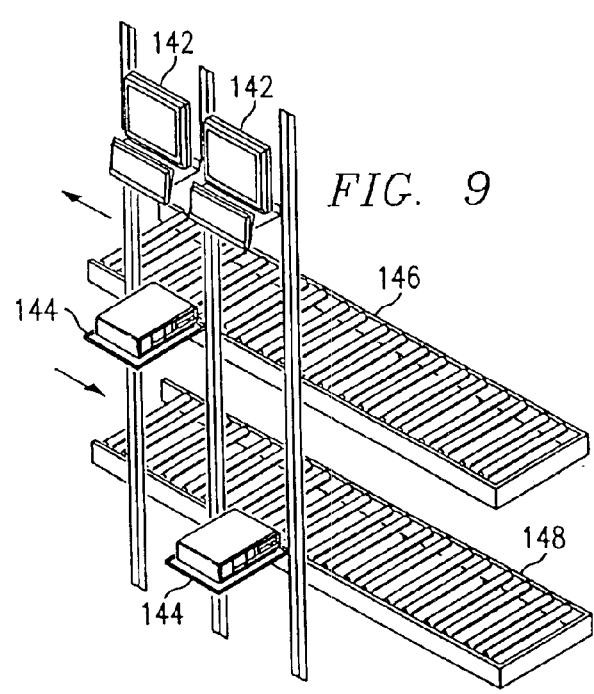
FIG. 9 is a generalized isometric view of a finishing station and associated transportation devices according to FIG. 6.

With reference now to FIG. 9, a portion of finishing station 140 is depicted in greater detail. Specifically, two displays 142 and two corresponding finishing trays 144 are depicted. Also shown are a finishing conveyor 146, an exit conveyor 148, and a configured product 147 situated on one of finishing trays 144. Exit conveyor 148 may also be referred to as a removal apparatus.

Configured products from burn station 120 may be received by finishing conveyor 146 and automatically conveyed to an available one of finishing trays 144. Finishing instructions from the manufacturing control system may then be displayed on display 142.

The configured product may be cleaned and inspected, for example to test for compliance with Federal Communications Commission (FCC) regulations regarding electromagnetic radiation (EMR). Operators C and D may cooperate in performing the burn-in and finishing operations, possibly with additional assistance from operators A and/or B. As depicted in FIG. 6, in the illustrated embodiment, build cell 78D include sufficient floor space to accommodate at least four operators A–D.

In the illustrated embodiment, finishing conveyor 146 and exit conveyor 148 are aligned generally vertically to conserve space, with finishing conveyor 146 receiving the computers at an upper level and exit conveyor 148 taking the finished computers away at a lower level. In alternative embodiments, however, the exit conveyor may be above the finishing conveyor. Preferably, electrical controls (e.g., toggle switches or push buttons) allow operators to move finishing trays 144 between the two levels.

Additional processing (such as additional software installation or configuration) may also be performed at finishing station 140, for example for orders with special or unusual requirements. Finishing station 140 preferably also includes a printer 145 for printing a label such as an asset tags to be applied to a computer when requested, according to the customer order. The asset tag may include identifying information for the product, such as a serial number, a model number, an order number, a customer identifier, and/or other information. The asset tag may also include one or more barcodes with one or more of those or other items of information. Finishing station 140 may also include one or more supplemental network connections 143 for use in installing and/or configuring additional data such as software.

Figure 12:
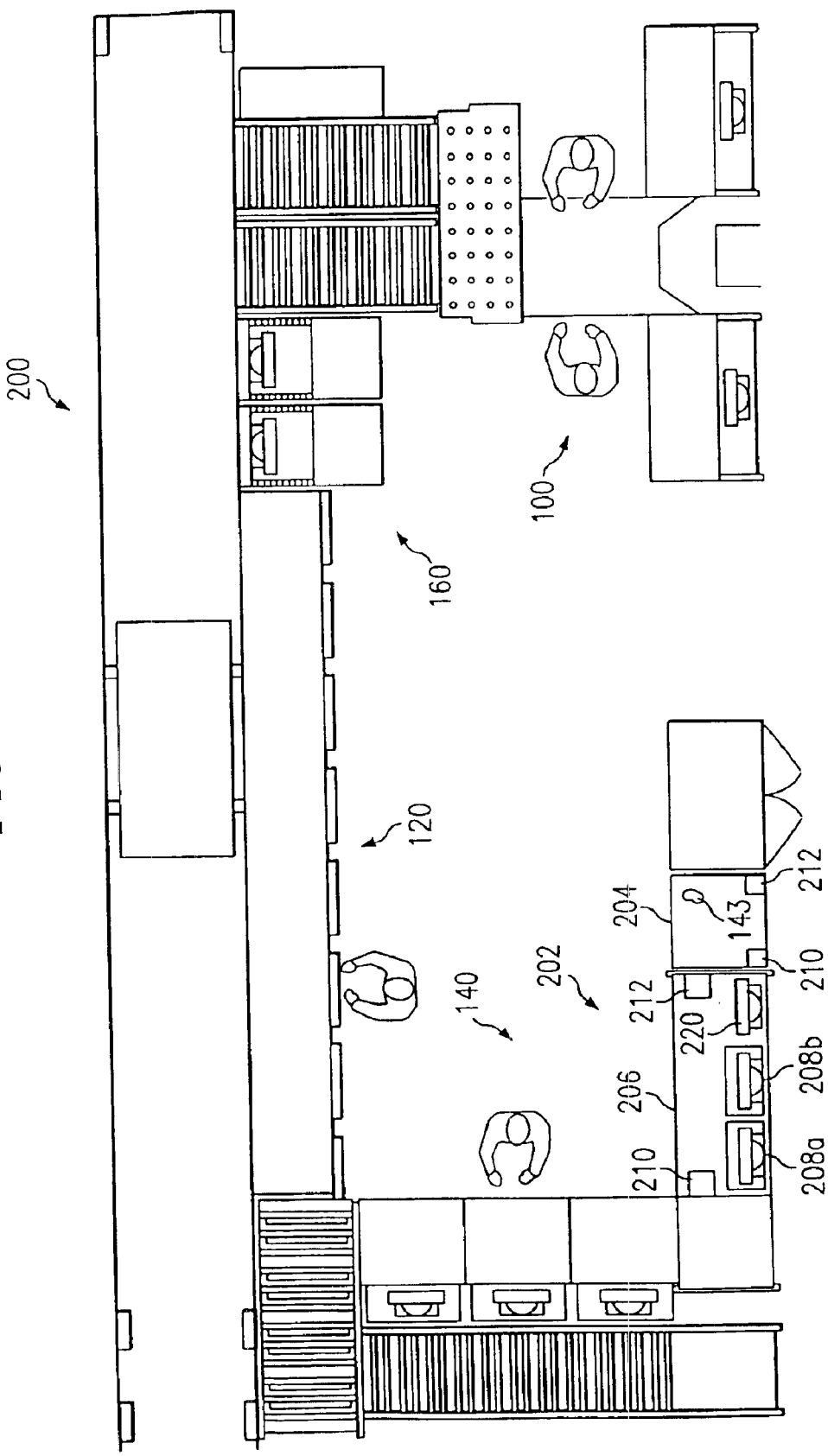
FIG. 12 is a generalized isometric view of a cell plus station.

Referring now to FIG. 12, an alternative embodiment of a build cell 200 may include a cell plus station 202 for satisfying atypical or unique customer requirements. Cell plus station 202 may be disposed within finishing station 140 as indicated. Cell plus station 202 may include a custom burn rack 204 with one or more burn compartments (not shown), a work surface or table 206, and workstations 208A and 208B. In one embodiment, six compartments are included, and those compartments are aligned vertically. Cell plus station 202 may also include one or more supplemental network connections for use in installing and/or configuring additional data such as software. At least one of the supplemental network connections is preferably implemented as an external or remote network connection. One or more additional supplemental network connection may be implemented as internal or local network connection.

For example, in the illustrated embodiment, cell plus station 202 includes one or more internal network connections 210 and one or more external network connections 212. Internal network connections 210 preferably provide access to data on on-site servers (e.g., one or more servers on a local area network (LAN) in manufacturing facility 40), and external network connections 212 preferably provide access to data on one or more off-site servers (e.g., via a wide area network). The types of connections that may be used as supplemental network connection 143 include, without limitation, satellite links, digital subscriber line (DSL) links, dial-up connections, and cable modems.

When a product is in burn station 120, the product may obtain data and/or software from one or more on-site servers. Internal network connections 210 in cell plus station 202 may, for example, provide access to the same or different on-site servers. Thus, some additional software and/or data may be installed from an on-site server at cell plus station 202 (for example, while the product is in custom burn rack 204).

Furthermore, additional software or data may be obtained from via external network connection 212 and installed at cell plus station 140. For example, a customer may have developed its own proprietary software, and that software may be stored on a server at a data processing center belonging to the customer. When purchasing a computer, the customer may request that the computer be delivered from the manufacturing facility with the customer's proprietary software preinstalled. According to the illustrated embodiment, the manufacturer can utilize external network connections 212 to obtain the proprietary software from the customer's server. Consequently, in addition to installing software from on-site servers on computers, the manufacture may install software from off-site servers on the computer. Other types of information could be obtained and loaded via external network connections 212 (including, without limitation, configuration specifications for network operability and proprietary and/or historical data). External network connections 212 therefore may minimize or eliminate the need to perform tasks such as additional configuration at a customer location.

Workstation 208A may also be connected to an external network connection 212, for example to obtain instructions to direct operators in performing the required specialized installation and/or configuration functions. Workstation 208B may control the operation of external network connections 212 and/or internal network connections 210. In addition to the displays for workstations 208A and 208B, one or more displays 220 may be provided and connected to the computers or products receiving the specialized service to display output from those computers.

Finishing station 140 may also be equipped to perform specialized testing with customer equipment (such as external hard drives or loop-back connectors) to ensure that the assembled computers are compatible with any specialized customer requirements. In addition, different types of specialized testing equipment can be provided to different build cells 78 to satisfy a wide variety of customer requirements.

Moreover, if specialized customer requirements change over time, the build cell architecture makes it easy to alter the ratio of build cells with and without specialized equipment and to change the type of specialized equipment in the build cells to accommodate the changing needs. For example, it would not be difficult to add or remove equipment within one or more cell plus stations 202 or even to add or remove one or more entire cell plus stations 202. Furthermore, when used to build products without specialized requirements, the build cells with specialized equipment may be as productive as build cells without.

The manufacturing control system preferably maintains records of which build cells 78 support which special requirements. The manufacturing control system preferably also uses those records to print travelers on appropriate kitting lines 56 (i.e., kitting lines linked to build cells with the required equipment) and to divert totes for products with specialized requirements to the build cells that are equipped to satisfy those requirements.

After the finishing operations are completed, the product, which may then be considered a finished product, is returned to transportation system 76 for transport to boxing facility 54.

Figure 10:
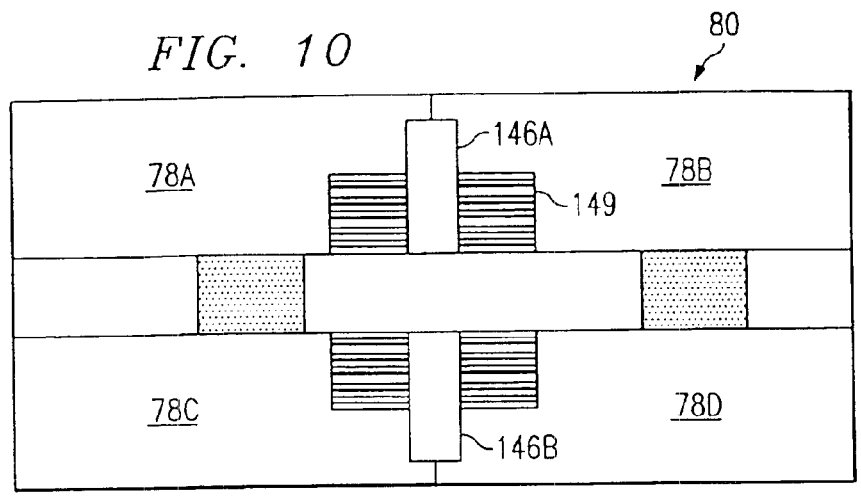
FIG. 10 is a generalized top view of transportation devices that service multiple build cells among a quadruplet of build cells according to FIG. 5.

In the illustrated embodiment, one finishing conveyor and one associated exit conveyor are preferably disposed between pairs of adjacent build cells. For example, with reference to FIG. 10, in the illustrated embodiment, finishing conveyor 146A and a corresponding exit conveyor (not expressly shown) are disposed between, and shared by, build cells 78A and 78B. Likewise, finishing conveyor 146B and a corresponding exit conveyor (not expressly shown) are disposed between, and shared by, build cells 78C and 78D. By providing one set of finishing and exit conveyors for each two build cells 78 (rather than one set for each build cell 78), additional savings may be realized with respect to space and capital investments for equipment.

Nevertheless, in the illustrated embodiment, each build cell 78 includes a staging area 149 for finished products, and exit conveyors 148 deposit each finished product onto the particular staging area 149 that corresponds to the finishing tray 144 from which that finished product was obtained. Thus, if a computer was finished in build cell 78D, exit conveyor 148 would stage that computer on the staging area 149 for build cell 78D. The manufacturing control system may monitor staging areas 149 and automatically cause receiving apparatus 94B to move staged computers from staging areas 149 to outgoing conveyor 86 of transportation system 76 (blocks 336 and 338). The computer may then be transported to boxing facility 54, to be packaged labeled, and then to shipping unit 44 for delivery to the customer.

As indicated by page connector B in FIGS. 11A and 11B, the assembly process may be repeated numerous times, with additional components being received and assembled, while assembled computers are being burned in and finished, etc. In addition, the manufacturing control system may compute performance ratings for build cells 78 indicating which cells are realizing the most output, the least test failures, and/or other performance characteristics. The manufacturing control system may utilize display 128 or a separate display (not shown) in each build cell 78 to reveal how the performance of each build cell compares with that of other build cells. For example, a performance rating for build cell 78D may be displayed, showing a rank for build cell 78D (and, by implication, operators A–D) relative to other build cells.

As will be evident to those of ordinary skill in the art, a manufacturing facility according to the present disclosure may enjoy numerous benefits, relative to prior art manufacturing facilities. For example, the architecture, equipment, and control systems used in the assembly unit of the present disclosure provide for substantially increased productivity and quality, while decreasing the space and labor requirements, relative to prior art facilities. Overall production costs may therefore be substantially reduced.

In addition, the architecture provides for rapid and inexpensive adaptation to changes in the production environment, in that stations within a build cell my be expanded or reduced in accordance with changing assembling requirements. For example, the number of quick-test shelves, burn compartments, and or finishing shelves can be increased or reduced if changes in the assembly process result in changes to the amount of time required to process a computer in each of the different stations. Operator productivity can therefore be maintained at a high level. Furthermore, the build cells can be used to build a wide range of different products without sacrificing efficiency or quality.

Although the present invention has been described with reference to an illustrative embodiment, those with ordinary skill in the art will understand that numerous variations of the illustrative embodiment could be practiced without departing from the scope of the present disclosure. For example, although the illustrated embodiment provides for automated transportation between the stations within the build cell, in alternative embodiments capital expenditures could be reduced by relying on manual movement of computers between two or more of the stations. Such an embodiment might be advantageous when building lightweight products, such as laptop computers and/or when labor costs are low.

Therefore, the present invention is not limited to the specifically disclosed embodiments but is defined by the following claims.

What is claimed is:

1. A build cell for manufacturing products according to customer orders, the build cell comprising:
    a first side, a second side adjacent to the first side, and a third side adjacent to the second side;
    a build station at which components are assembled according to a customer order to form an assembled product, the build station being situated at the first side;
    a burn station at which the assembled product is configured according to the customer order and tested to form a configured product, the burn station being situated at the second side;
    a finishing station at which the configured product is inspected to produce a finished product, the finishing station being situated at the third side;
    an open area of floor between the first and third sides, the open area dimensioned to accommodate at least one human operator
    fourth side adjacent to the third side; and
    printer at the fourth side for printing identifying information for the product on an asset tag to be applied to the configured product according to the customer order.

2. The build cell of claim 1, wherein:
    the components comprise hardware that was specified by the customer order,
        the configured product includes software that was specified by the customer order; and
    the finished product comprises an operational computer.

3. The build cell of claim 1 further comprising:
    a transportation device that transports the finished product from the build cell to a transportation system for delivery to a boxing facility whereby the finished product is packaged.

4. The build cell of claim 3, wherein the transportation device is located below a transportation system that includes an incoming conveyor and an outgoing conveyor that are aligned generally vertically to conserve space within a manufacturing facility.

5. The build cell of claim 3, wherein the finishing station further comprises:
    a finishing shelf;
    a finishing conveyor that transports the configured product to the finishing shelf; and
    an exit conveyor that transports the finished product from the finishing shelf to a staging area for removal from the build cell.

6. The build cell of claim 5, wherein the finishing conveyor and the exit conveyor are aligned generally vertically to conserve space within a manufacturing facility.

7. The build cell of claim 1, further comprising sufficient floor space to accommodate at least four human operators.

8. A build cell for manufacturing products according to customer orders, the build cell comprising:
    build station at which components are assembled to form an assembled product;
    burn station at which the assembled product is configured according to the customer order and tested to form a configured product, the burn station being generally aligned with a corresponding burn station in a first adjacent build cell;
    transportation device that transports the assembled product to the burn station, the transportation device being situated between the build cell and the first adjacent build cell to also service the corresponding burn station in the first adjacent build cell, wherein the transportation device comprises:
    a shelf that moves vertically to transport a tote to the build station; and
    the transportation device horizontally movable and the shelf vertically movable to transport the assembled product to the burn station.

9. The build cell of claim 8, wherein the transportation device also transports the components from an incoming conveyor to the build station.

10. The build cell of claim 8, wherein the transportation device also removes a finished product from the build cell.

11. The build cell of claim 8, wherein the build cell comprises an open area of floor dimensioned to accommodate an operator who manually transports the assembled product as required.

12. The build cell of claim 8, further comprising a display that depicts a performance rating for the build cell, relative to other build cells in a manufacturing facility.

13. The build cell of claim 8, wherein the burn station comprises:

a matrix of compartments, including a plurality of burn compartments and at least one compartment that receives assembled products destined for an electromechanical repair (EMR) station.

14. The build cell of claim 8, wherein the burn station comprises:

a matrix of compartments, including a plurality of burn compartments and at least one compartment that receives assembled products from an electromechanical repair (EMR) station.

15. The build cell of claim 8, further comprising a barcode scanner that obtains information from one or more of the components that are assembled.

16. The build cell of claim 8, wherein the product comprises:

a data processing system that was ordered with specified hardware and software components, and the data processing system is tested and cleaned at a finishing station.

17. A build cell for manufacturing products according to customer orders, the build cell comprising:

build station at which components are assembled to form an assembled product, the build cell including a quick-test station and an open area of floor dimensioned to accommodate an operator;

burn station at which the assembled product is configured according to the customer order and tested to form a configured product, the burn station being generally aligned with a corresponding burn station in a first adjacent build cell; and transportation device that transports the assembled product to the burn station, the transportation device being situated between the build cell and the first adjacent build cell to also service the corresponding burn station in the first adjacent build cell and wherein:

the transportation device automatically transports the assembled product to the quick-test station in response to detecting the assembled product at an exit stage of the build station;

the transportation device automatically transports the assembled product from the quick-test station to the burn station in response to a first signal from the operator;

the transportation device automatically transports the configured product from the burn station to a finishing station in response to a second signal from the operator; and the transportation device automatically transports the finished product from an exit conveyor to an outgoing conveyor in response to detecting a finished product at an exit stage of the finishing station without the operator manually lifting the assembled product.

* * * * *